Jan. 13, 1959   N. P. GRELLER ET AL   2,868,394
CONVEYOR
Filed Sept. 26, 1957   2 Sheets-Sheet 1
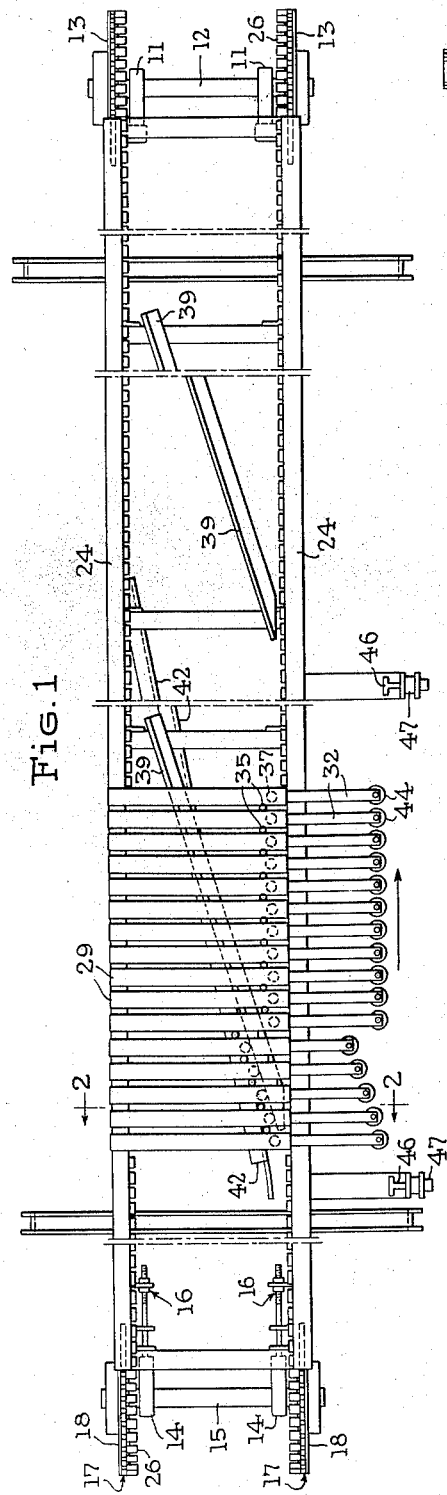
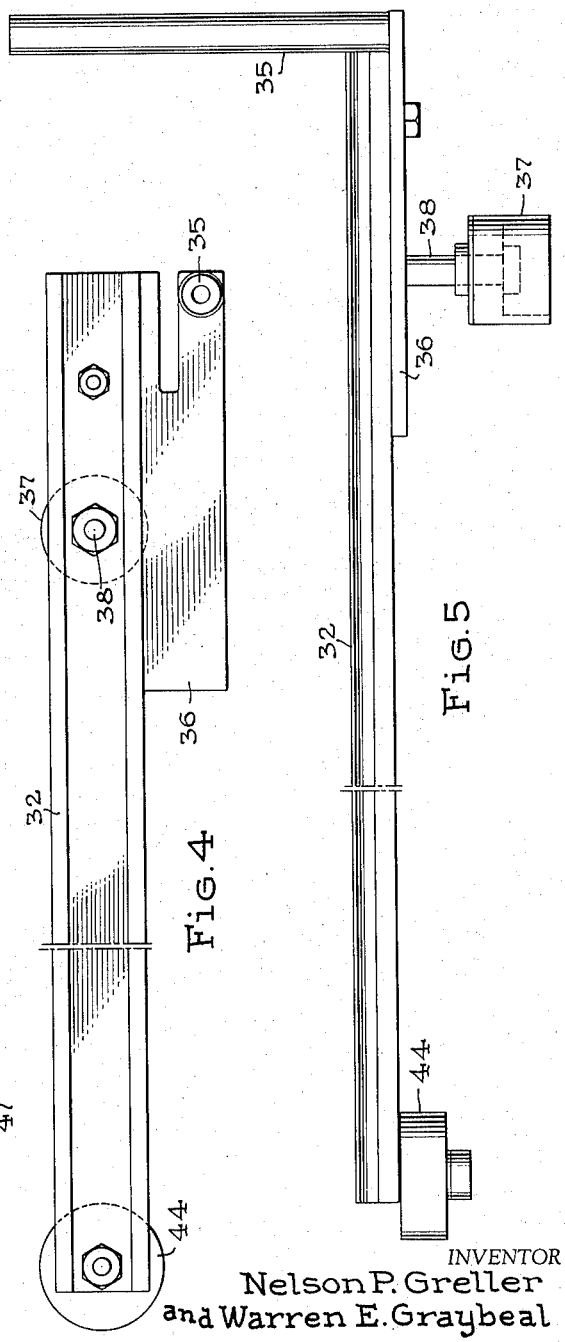
INVENTOR
Nelson P. Greller
and Warren E. Graybeal
BY Dodge and Sons
ATTORNEYS

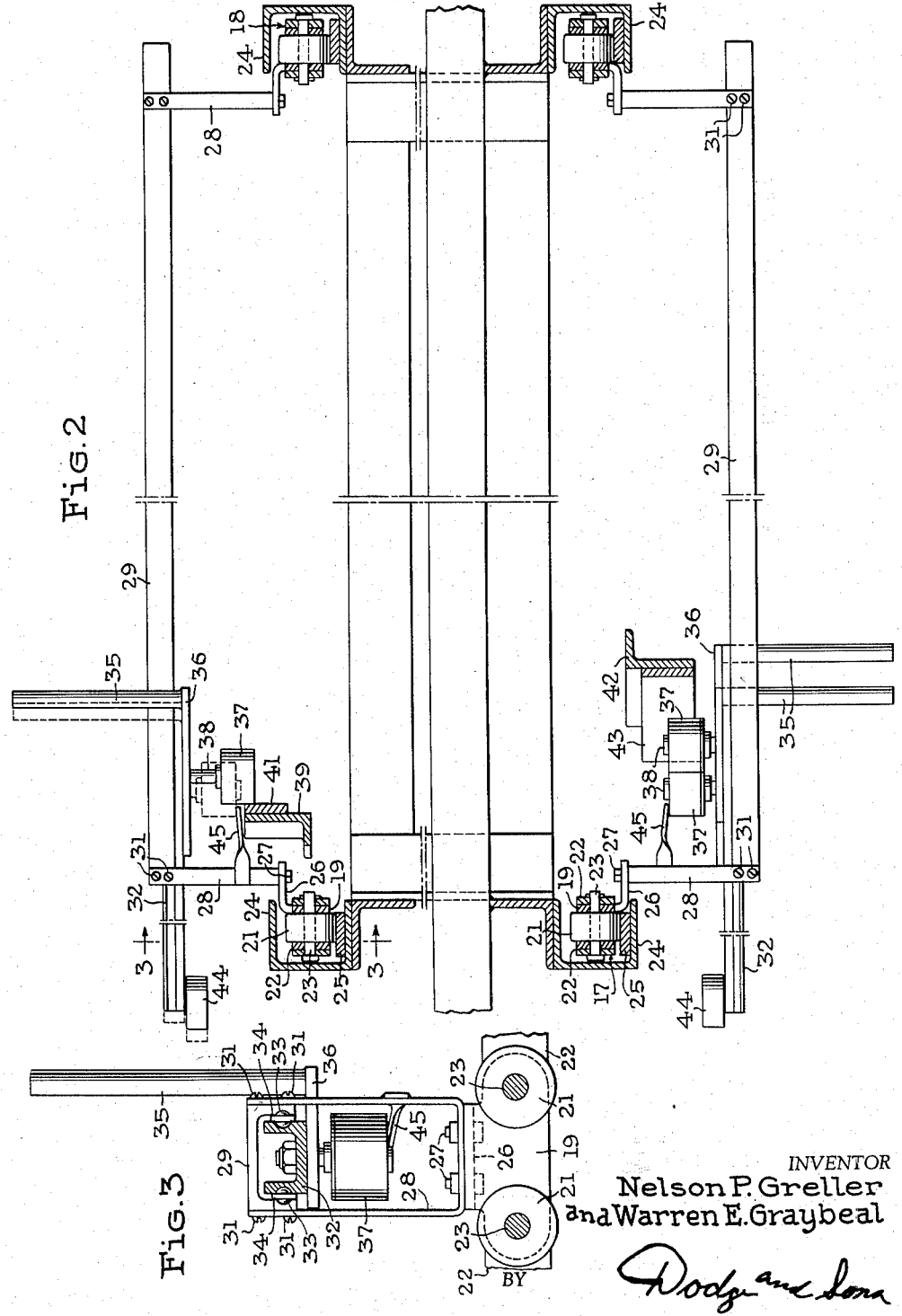

United States Patent Office 2,868,394
Patented Jan. 13, 1959

2,868,394

CONVEYOR

Nelson P. Greller, Washington, D. C., and Warren E. Graybeal, Hyattsville, Md.

Application September 26, 1957, Serial No. 686,493

9 Claims. (Cl. 214—11)

This invention relates to conveyors and particularly to apron conveyors having means to discharge selected articles at selected stations. As heretofore embodied, to handle articles which vary considerably in size, devices of this type have required excessive space.

In a prior application, Serial No. 484,618, filed January 28, 1955, Nelson P. Greller discloses method and apparatus for sorting articles which vary in size, by pushing them laterally off the edge of the conveyor apron at different stations. At each station there are a plurality of transversely moving diverters, which may be set individually to engage or pass clear of packages moving with the conveyor.

There is a set of diverters at each station and each station is fixed in length. Nevertheless economy in the use of space on the conveyor is had by measuring the horizontal dimension of each package in the direction of conveyor travel and rendering effective only enough diverters of any selected set to engage the package throughout its length. This makes it possible to space successive packages quite closely, with resultant efficient use of the conveyor.

The present invention affords an improved mechanism operating according to the method claimed in said prior Greller application.

In the prior structure the diverters were guided and moved by means distinct from the conveyor, but necessarily timed in relation to conveyor travel. An outstanding characteristic of the present invention is that the diverters are mounted on and sustained by the conveyor apron and are actuated in their transverse motions by means driven by travel of the conveyor itself. This simplifies the structure, times the excursion of the diverters precisely in relation to the travel of the conveyor apron, and makes possible a very simple selecting mechanism for determining which diverters are to be active and at what point, in the length of the conveyor they shall become active.

In the preferred embodiment the diverters are upstanding arms, each mounted on a corresponding slide. Each slide is reciprocable in a corresponding guide extending in a horizontal direction transverse to the conveyor path. It is convenient to construct the conveyor apron in the form of a series of connected slightly spaced slats, and build each guide into a corresponding slat, and so to form the slide that the diverter carried thereby projects through and reciprocates in the slot-like interval between two adjacent slats. This makes it possible to sort thin packages, such as letters.

Adjacent to, and above the lower run of the conveyor apron, and close to the charging station, is a fixed horizontal retractor cam-rail oblique to the path of the apron and serving to return to retracted position all diverter slides which have left that position. At each diverter station and beneath the upper run of the conveyor apron are fixed horizontal diverting cam rails oblique to the path of the apron. There is one such rail for each station.

All the aforesaid cam rails coact with the same followers. There is one such follower on each diverter slide. Means must be provided to render the diverter cam rails selectively effective or ineffective to shift individual diverter slides. This is most conveniently accomplished by shifting the follower so that it will or will not engage diverter cam rails which can thus be fixed in position. The followers always engage the retractor cam rail as they pass it.

The desired selection is attained by using a gravity-shifted follower on each diverter slide. This takes the form of a roller rotatable on, and also axially shiftable along, an elongated journal, one journal fixed on each diverter slide. The axis of the journal is substantially vertical when the slide is being carried along the upper run and also when carried along the lower run of the conveyor, so that on respective runs the roller gravitates in opposite directions, and thus tends to move to different positions relatively to its slide.

As a slide approaches the head end of the conveyor, while moving on the lower run, the retractor cam bar moves each slide and its roller fully to retracted position. At this time since the lower run is inverted, the cam followers all have gravitated to positions which will become their upper positions as soon as the slides move onto the top run. In such positions on the top run the rollers pass above the diverter cams. To preserve this upper position until the diverter has been selected for action, the terminal portion of the retracting motion of the slide causes each roller to enter a short distance behind a retainer lug, so that after the slide reaches the top run the follower cannot drop into its diverter rail engaging position until the slide has been moved a short distance in the diverting direction. In effect the selector (whatever form it may take) nudges the diverter slide in the diverting direction. This at once frees the follower to drop into position to engage the nearby diverting cam rail and the slide is thereupon moved by the diverter rail throughout its diverting stroke.

This action can occur only once in a single traverse of a given diverter past all the unloader stations but can be caused to occur at any such station. There is a diverting cam rail and a selector at each station.

To nudge the slide it is preferred to use a solenoid, which when energized reacts upon a second roller mounted on the end of the slide. Control of the solenoids affords control of the system.

A system, organized as above described, will now be described in detail, reference being made to the accompanying simplified drawings which show the significant features of an embodiment which has been built and successfully operated.

In the drawings:

Fig. 1 is a plan view of the conveyor with the middle portion broken away to reduce the length of the view. The slats and diverters of the conveyor apron are shown only at the first diverter station, to permit the chains, chain-guides, two diverter cams and the retractor cam to be clearly illustrated.

Fig. 2 is a vertical cross-section on the line 2—2 of Fig. 1, parts being broken way to reduce the height and width of the view, which is drawn on a larger scale than is Fig. 1.

Fig. 3 is a view in elevation on a larger scale than Fig. 2, looking at the end of a conveyor slat and showing a diverter slide, its guide bearing, portions of a side chain, the yoke which connects the chain to the end of the slat, and the lug which engages the follower roller.

Figs. 4 and 5 are respectively plan and side elevation of a diverter slide and diverter, each with the middle portion broken away to reduce the lengths of the views. These views are drawn on a larger scale than Fig. 3.

Statements of direction refer to Fig. 1.

A base frame of conventional form, not detailed in the drawings, carries at its right end two bearings 11 for a horizontal shaft 12 on which are fixed two identical sprockets 13. The shaft 12 is power driven by conventional means, not shown. The same frame carries at the left end two bearings 14 for a horizontal shaft 15 which is parallel with and at substantially the same elevation as shaft 12. The bearings 14 are slidably mounted on the base frame and may be shifted by threaded units 16 toward and from the bearings 11 to adjust the tension of the two endless sprocket chains 17 which are trained around sprockets 13 and identical sprockets 18, fixed on shaft 15. The sprockets 13 and 18 are equally spaced, so the chains 17 are parallel and substantially horizontal.

Alternate links in the chains are formed as is link 19 in Figs. 2 and 3, each such alternate link carrying two rollers 21. Connecting the alternate links 19 are plain links 22. Ordinary hinge pins 23 are used as journals for the rollers and to connect adjacent links, a familiar commercial construction.

The chains 17 and rollers 21 travel in horizontal channel irons 24 supported by the base frame with their flanges presented toward each other in pairs (see Fig. 2). The channels 24 define four horizontal inter-sprocket guideways which support the upper and lower runs of the two chains. These confine the chains and sustain much of the load, so that the chains are not severely stressed in tension. Strips 25 of wood or plastic serve as tracks for the rollers 21 and have a silencing effect.

Each link 19 includes a horizontal offset 26 to which is bolted at 27 a U-shaped stirrup 28 which straddles the end of an inverted slat-forming channel 29 and is bolted to the flanges of the channel at 31. The channel iron 29 extends transversely the full width of the conveyor, and the backs of the channel webs which are spaced a small distance apart serve as the supporting surface of the conveying apron.

Between the flanges of each channel 29 is a smaller channel 32 which is sustained by bearing balls 33 working in opposed groove races formed in the flanges of the channels 29 and 32. The balls are spaced by retainer strips 34 (see Fig. 3). The smaller channel 32 is the diverter slide, and carries at one end the diverter 35, which is a finger or lug perpendicular to the plane of the conveyor apron and laterally offset on a plate 36. The offset permits the diverter 35 to extend through the interval between two of the slat channels 29 (see Fig. 1).

The follower for the diverter cam rails is the roller 37, vertically shiftable on the journal 38. As shown on the upper run in Fig. 2, the full-line position is the one in which it engages the diverter cam rail, one of which is there shown at 39 in this figure. The cam rail has a sound reducing facing 41.

As indicated in Fig. 2, follower rollers 37 at the head end of the lower run are returned to retracted position by the retractor cam rail 42 of which there is only one. It has a sound-reducing facing 43. There is a diverter cam rail 39 for each station. Thus two are indicated in Fig. 1 which shows only part of the total length of the conveyor.

The rollers 44 on the end of each diverter slide 32 remote from the diverter finger 35 are to receive the "nudge" which shifts the slide 32 far enough to allow the roller 37 to clear the retainer 45, which, as best shown in Figs. 2 and 3, is simply a finger fixed on the corresponding stirrup 28.

The "nudge" required to release rollers 37 from the retainers 45 is provided by the movement of the armature 46 of solenoid 47, there being one such solenoid at each diversion station. This nudge moves carriage 32 from the retracted position shown in broken line in Fig. 2 to the full line position of Fig. 2. This motion of the carriage 32 permits roller 37 to drop from the broken line to the full line position of Fig. 2. In the latter position roller 37 will engage the diverter cam rail 39.

The solenoid 47 may be controlled by a manually operable switch, or it may be controlled by an automatic control circuit. For the purposes of this disclosure manual operation will afford a sufficient understanding of the operation of the invention. An operator stationed to observe travel of the conveyor will cause the solenoid 47 to be energized as the leading edge of an article to be diverted comes abreast of the solenoid, the solenoid 47 is then maintained in its energized position, until the package has passed the solenoid. This will "nudge" rollers 44 connected with those carriages 32 which lie beneath the article. The solenoid 47 is then deenergized. The follower rollers 37 thus released gravitate to their diverter cam rail engaging position. Continued movement of the conveyor causes the carriages whose follower rollers have dropped to make a diverting excursion laterally across the conveyor. The diverter fingers 35 on the laterally moving carriages engage the article carried by the associated guide 29 and push it off the side of the conveyor.

On the return run the rollers 37 gravitate to their other position on the journals 38. Conveyor movement will cause the rollers of those carriages which have made a diverting excursion to be returned laterally across the conveyor by engaging the return cam rail 42. This rail 42 causes the carriages to move fullstroke so that the rollers 37 are again engaged by the retainers 45 (see particularly Fig. 2). Thus the carriages are readied for another conveying run.

The terminal portion of the facing 43 on rail 42 extends slightly beyond the end of the rail itself. It is preferably resilient and guards against accidental displacement of the rollers 37 from engagement with retainer 45. Such displacement might occur as an incident to rebounding of the carriage after completion of the return stroke.

The solenoid 47 affords a means whereby the number of carriages caused to make a diverting excursion may be closely controlled, and only those associated with the article carrying slides are conditioned for transverse movement. This means that articles of widely differing size may be placed on the belt in close succession and may be removed at a selected station without interfering with continued movement of the articles ahead of or behind it. Thus the belt is used to its full capacity without in any way hampering the diverting or sorting operation.

It will be readily apparent that return rails could be located immediately after each removal station, although a different type of follower roller retainer would be necessary.

The preferred embodiment has been described in considerable detail, however, the inventive concept is not limited to this structure and no such limitation is implied except as may be expressed in the appended claims.

What is claimed is:

1. In a conveyor, the combination of means forming an endless conveyor apron; means serving to support said apron in two substantially horizontal runs, namely, a conveying run and a return run in which last the apron is inverted; a plurality of transverse guides carried by the apron; a carriage slidable in said guides and each including a portion which projects upward above the apron on the conveying run thereof; means positioned to function at each diversion station and capable of being rendered selectively operative or inoperative to cause diverter carriages to make excursions along said guides; means operable to select the operative or inoperative condition for successive carriages; and means rendered effective by travel of each carriage along the return run to retract successive carriages after their excursions.

2. The combination defined in claim 1 in which the motion of the carriages along said guides is derived mechanically from motion of the conveyor apron.

3. In a conveyor, the combination of means forming an endless conveyor apron; means serving to support said apron in two substantially horizontal runs, namely, a conveying run and a return run in which last the apron is inverted; transverse guides carried by the apron; diverters slidable in said guides and each comprising a carriage which engages the guide, and a finger supported by the carriage, the fingers projecting upward above the apron on the conveying run thereof; cam followers, one shiftable on each carriage in a defined path such that each follower tends to gravitate to opposite limiting positions as the carriage shifts between runs; a reset cam rail positioned and formed to engage the followers on the return run and move them to a retracted position; retainer means effective in said retracted position to retain the follower against a gravitational shift from its then position; a succession of diverter cam rails beneath the conveying run and corresponding to successive diverter stations, said diverter rails being positioned to clear said followers when held by said retainer means but to engage them and move the diverter carriage upon gravitational shift after the corresponding retainer is rendered ineffective; and means settable to disable said retainer means at chosen points coordinated with said diverter cam rails.

4. The combination defined in claim 3 in which the cam followers are rollers shiftable axially on journals substantially normal to the surface of the conveying run of the apron.

5. The combination defined in claim 3 in which the cam followers are rollers shiftable axially on journals substantially normal to the surface of the conveying run of the apron; and the retainers are stops fixed to respective guides and positioned to obstruct axial motion of the corresponding roller from the position to which it gravitates on the return run.

6. The combination defined in claim 3 in which the cam followers are rollers shiftable axially on journals substantially normal to the surface of the conveying run of the apron; the retainers are stops fixed to respective guides and positioned to obstruct axial motion of the corresponding roller from the position to which it gravitates on the return run; and the means settable to disable the retainer means serve to start the carriages moving successively in the diverting direction far enough to free the followers.

7. The combination of means forming an endless conveyor apron having a plurality of transverse guides; means to support said apron; movable carriage means associated with each of said guides and having an initial position relative thereto, and arranged to engage conveyed articles; means operable to cause selected carriage means to make excursions along said guides at a selected diverting station; and means effective after the completion of said excursion to return the carriage means to initial position.

8. In a conveyor, the combination of means forming an endless conveyor apron including a plurality of transverse slide guides; slides movable along each guide and having an initial position relative thereto; and means operable to move selected slides along their guides.

9. The combintion of means forming an endless conveyor apron having a conveying run and a return run; an endless series of diverter elements carried on said apron and initially spaced apart along one side thereof; and means operable to move selected elements across said apron.

References Cited in the file of this patent
UNITED STATES PATENTS
2,311,640  Cornell _____ Feb. 23, 1943